Dec. 31, 1929.       M. BICHEROUX       1,741,912
MANUFACTURE OF WINDOW GLASS
Filed Jan. 30, 1929

Inventor:
Max Bicheroux
Attorneys.

Patented Dec. 31, 1929

1,741,912

UNITED STATES PATENT OFFICE

MAX BICHEROUX, OF AACHEN, GERMANY

MANUFACTURE OF WINDOW GLASS

Application filed January 30, 1929, Serial No. 336,190, and in Germany January 27, 1928.

This invention relates to the manufacture of high-grade window glass from refined molten glass and essentially consists in first rolling the glass mass in a rolling mechanism with at least one pair of rolls to a primary sheet which is of a thickness considerably greater than the desired final thickness of the glass sheet and then reducing this sheet in the same operation by drawing to the desired final thickness.

According to the known processes of making window glass from molten glass, the glass mass is either rolled into sheets or ribbons between two or more rolls or the sheets or ribbons are drawn directly from the liquid glass mass. In these processes the glass sheets are practically given their final thickness already in the first pair of rolls or immediately after their exit from the glass mass. Accelerations which are, in these known processes, imparted to the tables receiving the sheets or to all or some of the further pairs of rollers, between which the glass sheet is passed after the forming, are only very slight and merely serve the purpose of stretching the glass sheets or ribbons, that is to say smoothing the glass faces or at the most precisionizing the thickness of the sheet.

The present process therefore materially differs from the known ones inasmuch as according to it there is first formed in a rolling mechanism comprising at least one pair of rolls a primary or preliminary sheet the thickness of which is, for instance, double as great as the desired final thickness or even more, this primary sheet being then drawn to the desired low final thickness, which means that the glass sheets or ribbons obtain their proper shape behind the first pair of rolls.

To further ameliorate the product the invention proposes to laterally stretch and smoothen the sheet of glass while still in plastic condition, for instance during the operation of drawing. This may be effected by passing the sheet over one or more rollers provided with oppositely handed threads extending from the middle of the rollers to their ends. These rollers may be driven so as to rotate either in the direction of the movement of the glass sheet or in the opposite direction.

Figure 1:
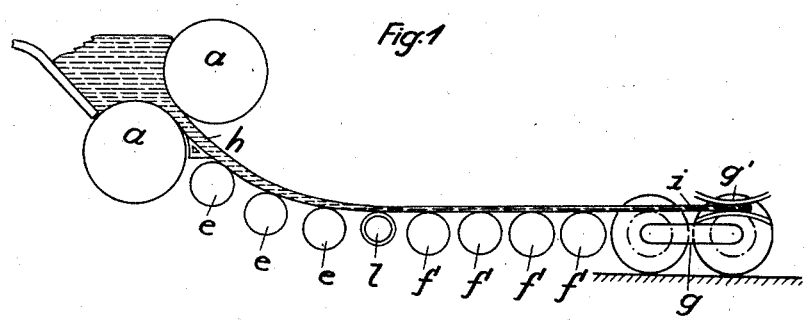
Figure 2:
Figure 3:
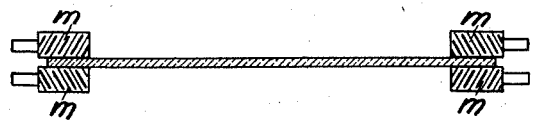
Figure 4:
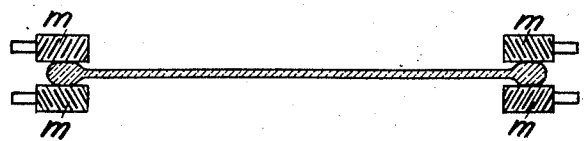

The accompanying drawing illustrates an embodiment of a device for making window glass according to the invention. Fig. 1 is a diagrammatic side elevation of the device; Fig. 2 is a detail view of a stretching and smoothing roller; Fig. 3 is a transverse section of the glass sheet with means at its margins for spreading the sheet in the direction of its width, and Fig. 4 is a view similar to Fig. 3 with a glass sheet having thickened margins.

Referring to the drawings, $a$ are the rolls of a rolling mechanism to which the liquid glass is supplied and by which same is rolled into a primary sheet $h$ which is of a considerably greater thickness than the finished product. The primary sheet passes over rollers $e$ and $f$ and is seized at its head end by grippers $g'$ of a car-like draft device $g$ which draws the glass sheet to the reduced final thickness shown at $i$, whereupon the sheet is fed on further rollers to the annealing room, not shown. $l$ denotes stretching or smoothing rollers which, as more particularly shown in Fig. 2, are provided with oppositely handed helical threads which extend from the middle to the ends of the rollers and which exert an outwardly directed stretching action on the glass sheet transversely thereof. $m$ are pairs of pressure rollers with outwardly driving threads between which the margins of the glass sheet, preferably thickened as shown in Fig. 4, are guided and which effect a transverse spreading or straining of the glass sheet.

The rolls $a$ are adjustable relatively to each other for changing the size of the forming pass between them. In this manner, it is for instance possible to roll the primary sheet at the beginning of the operation with a comparatively small thickness for avoiding losses of glass and set the rolls for making a primary sheet of great thickness no sooner than the actual drawing has begun.

One or some of the guide rollers $e$, which are preferably arranged instead of the usual inclined chute, may be polished or/and highly heated. They may also be covered with asbestos or with a fabric which is to be kept moist. Their speeds of rotation may vary in accordance with the thickness and speed of forward movement of the glass sheet, and there may also be a slight difference between the speeds of the several rollers. In some cases, it may also be preferable to rotate the rollers *e* in a direction opposite to the direction of feed of the glass.

The forming rolls *a* and the guide rollers *e* may be made of different metals.

The guide rollers *f* or some of them may be formed as stretching and smoothing rollers in the manner of the rollers *l*. The stretching and smoothing rollers *l* or those of the guide rollers *f* which are formed as stretching and smoothing rollers are arranged at points where the glass still possesses its first heat or in zones of reheating or at both points. The stretching and smoothing rollers can be formed so that they act on the glass in different degrees; this may be obtained by making the helical threads of different depth or sharpness.

Having thus described my invention, what I claim as new and desire to secure by Letters Patent is:—

1. The method of making window glass from a mass of refined molten glass, which consists in rolling the glass mass into a primary sheet of great thickness, drawing this primary sheet during the same operation to the desired final thickness and simultaneously smoothing and stretching the sheet laterally.

2. A device for making window glass from a mass of refined molten glass, comprising in combination a rolling mechanism with at least one pair of cooperative forming rolls adapted to roll the glass mass into a primary sheet of great thickness, means for seizing the sheet at its head and drawing it to the desired final thickness, and means for supporting the sheet while being drawn and moved forward.

3. In a device for making window glass from a mass of molten glass, in combination a rolling mechanism with at least one pair of cooperative forming rolls designed to roll the glass mass into a primary sheet of great thickness, a travelling draft device with grippers for seizing the rolled primary glass sheet at its head end and drawing it out to the desired final thickness, and guide rollers for supporting the glass sheet as it is drawn out and moved forward.

4. In a device for making window glass from a mass of molten glass, in combination a rolling mechanism with at least one pair of cooperative forming rolls designed to roll the glass mass into a primary sheet of great thickness, a travelling draft device with grippers for seizing the rolled primary glass sheet at its head end and drawing it out to the desired final thickness, guide rollers for supporting the glass sheet, and means for smoothing and laterally stretching the sheet as it is being drawn.

5. In a device for making window glass from a mass of refined molten glass, in combination at least one pair of adjustable forming rolls adapted to roll the glass mass into a primary sheet of a thickness greater than the thickness of the finished product, means to support the glass sheet during its forward movement, a draft device for seizing the rolled sheet of glass at its forward end and drawing it to the desired final thickness, and revolving rollers arranged transversely of the sheet at such points where the sheet is still plastic, these rollers having oppositely handed helical threads extending from the middle to the ends of the rollers and designed to act on the sheet for smoothing it and stretching it in the direction of its width.

In testimony whereof I have signed my name to this specification.

MAX BICHEROUX.